(12) United States Patent
Wei

(10) Patent No.: US 10,156,694 B2
(45) Date of Patent: Dec. 18, 2018

(54) IMAGING LENS

(71) Applicant: Chuandong Wei, Shenzhen (CN)

(72) Inventor: Chuandong Wei, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/417,215

(22) Filed: Jan. 26, 2017

(65) Prior Publication Data
US 2018/0164534 A1  Jun. 14, 2018

(30) Foreign Application Priority Data

Dec. 10, 2016 (CN) ..................... 2016 2 1353259 U

(51) Int. Cl.
*G02B 7/02* (2006.01)
*G02B 13/00* (2006.01)

(52) U.S. Cl.
CPC .............. *G02B 7/025* (2013.01); *G02B 7/021* (2013.01); *G02B 13/0045* (2013.01)

(58) Field of Classification Search
CPC ........ G03B 9/06; G03B 11/04; G03B 11/043; G03B 21/145; G03B 21/2053; G03B 21/2086; G03B 9/10; G02B 7/021; H04N 5/2251; H04N 5/2257; H04N 9/3141
See application file for complete search history.

(56) References Cited

U.S. PATENT DOCUMENTS

| | | | | |
|---|---|---|---|---|
| 7,944,632 B2* | 5/2011 | Wang | ..................... | G02B 7/021 359/819 |
| 2006/0132936 A1* | 6/2006 | Yu | ............................. | G02B 7/08 359/824 |
| 2006/0276072 A1* | 12/2006 | Fukasawa | ................ | G03B 9/06 439/397 |
| 2008/0131112 A1* | 6/2008 | Aoki | ...................... | G03B 17/48 396/429 |
| 2010/0053781 A1* | 3/2010 | Wang | ..................... | G02B 7/021 359/819 |
| 2010/0246033 A1* | 9/2010 | Hattori | ................... | G02B 7/021 359/819 |
| 2013/0170037 A1* | 7/2013 | Iizuka | .................. | G03B 11/043 359/511 |

(Continued)

*Primary Examiner* — William R Alexander
*Assistant Examiner* — Balram T Parbadia
(74) *Attorney, Agent, or Firm* — Na Xu; IPro, PLLC

(57) ABSTRACT

An imaging lens including a lens group, a lens barrel and at least one light shading plate; the lens barrel includes first barrel wall forming light aperture, second barrel wall which is bended and extends from first barrel wall, internal wall and external wall, N clamping positions are provided in circumferential direction on internal wall, each clamping position includes M equally spaced bosses on internal wall; surface of boss toward first barrel wall is supporting surface, horizontal height of boss in same clamping position are identical but different from horizontal heights of bosses in other clamping positions; M clamping slots configured to fit bosses in any clamping position at the same time and avoiding slots configured to accommodate bosses in remaining clamping positions, which are equally spaced, are provided in circumferential direction on light shading plate spaced from adjacent lens located at a side of first barrel wall.

8 Claims, 4 Drawing Sheets

(56) References Cited

U.S. PATENT DOCUMENTS

2014/0254034 A1\* 9/2014 Lyu .................. G02B 7/021
                                                359/819
2015/0086190 A1\* 3/2015 Kozu .................. G03B 9/06
                                                396/462

\* cited by examiner

IMAGING LENS

TECHNICAL FIELD

The present disclosure relates to an optical component and, specifically, relates to an imaging lens applied to a portable electronic device.

BACKGROUND

In recent years, portable electronic devices have been developing rapidly, for example, smart electronic devices and tablet computers, etc. have been wildly used in modern people's life. Imaging lens modules which are installed on the portable electronic devices have also been developing accordingly. With the advancement of technologies, the requirements by users on the imaging quality of the lens are also becoming higher and higher.

A light shading plate is an optical component commonly used in the imaging lens; when external light enters into an imaging lens, the light shading plate arranged in the lens group can block and absorb stray light, moreover, due to the blocking of the light shading plate, the distance between the two lenses adjacent to the light shading plate can by adjusted by the light shading plate. In the prior art, the spacing distance between the above-mentioned two lenses varies according to actual demands and thus light shading plates with different thicknesses need to be selected accordingly. Therefore, light shading plates with different thicknesses are needed so as to satisfy the requirements of the lenses, which limits the application range of the light shading plate.

Thus, it is a problem how a light shading plate installed between two adjacent lenses can satisfy the requirements on a plurality of spacing distances.

BRIEF DESCRIPTION OF DRAWINGS

Many aspects of the exemplary embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

REFERENCE SIGNS

1—lens barrel, 2—light shading plate, 11—first barrel wall, 12—second barrel wall, 13—internal wall, 15—boss, 21—clamping slot, 22—avoiding slot, 23—notch, 3—lens, 1'—lens barrel, 15'—boss, 13'—internal wall.

DESCRIPTION OF EMBODIMENTS

In order to further make objectives, technical solutions and advantages of the present disclosure more clearly, embodiments of the present disclosure are described in detail as follows with reference to the accompanying drawings. However, those skilled in the art could understand that, in the embodiments of the present disclosure, a plurality of details disclosed herein are merely used to better understand the present application. The technical solutions which the present application seeks to protect can also be realized even without these technical details and various changes and modifications based on the following embodiments.

Figure 1:
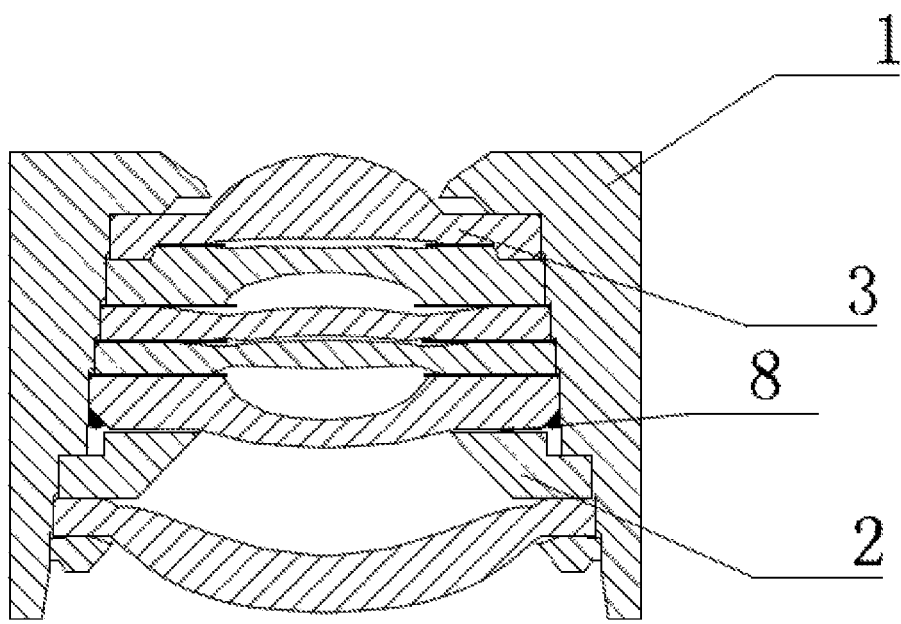
FIG. 1 is a structural schematic diagram of an imaging lens in accordance with Embodiment 1 of the present disclosure.
Figure 2:
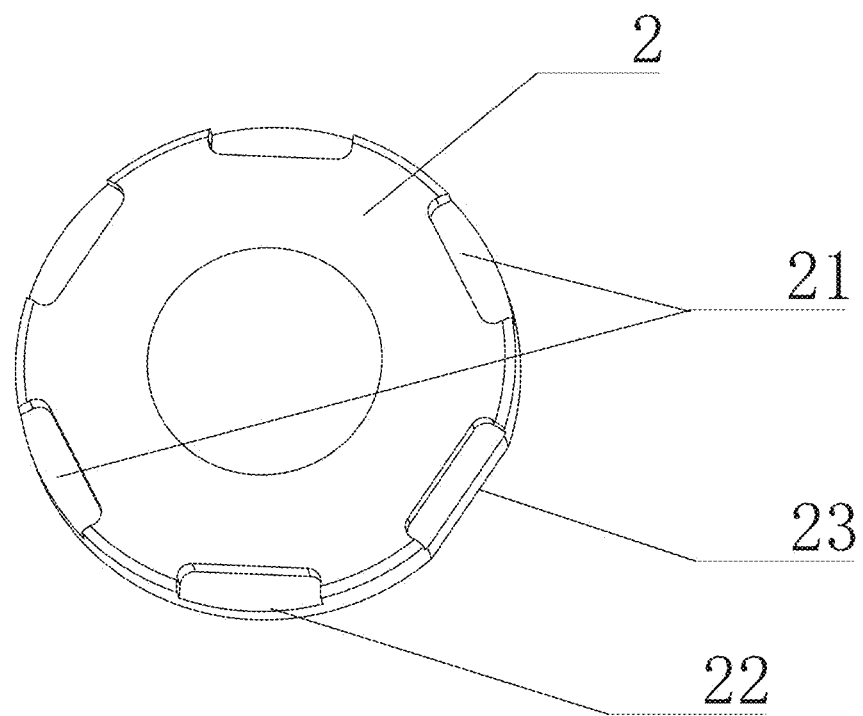
FIG. 2 is a structural schematic diagram of a light shading plate in accordance with the present disclosure.
Figure 3:
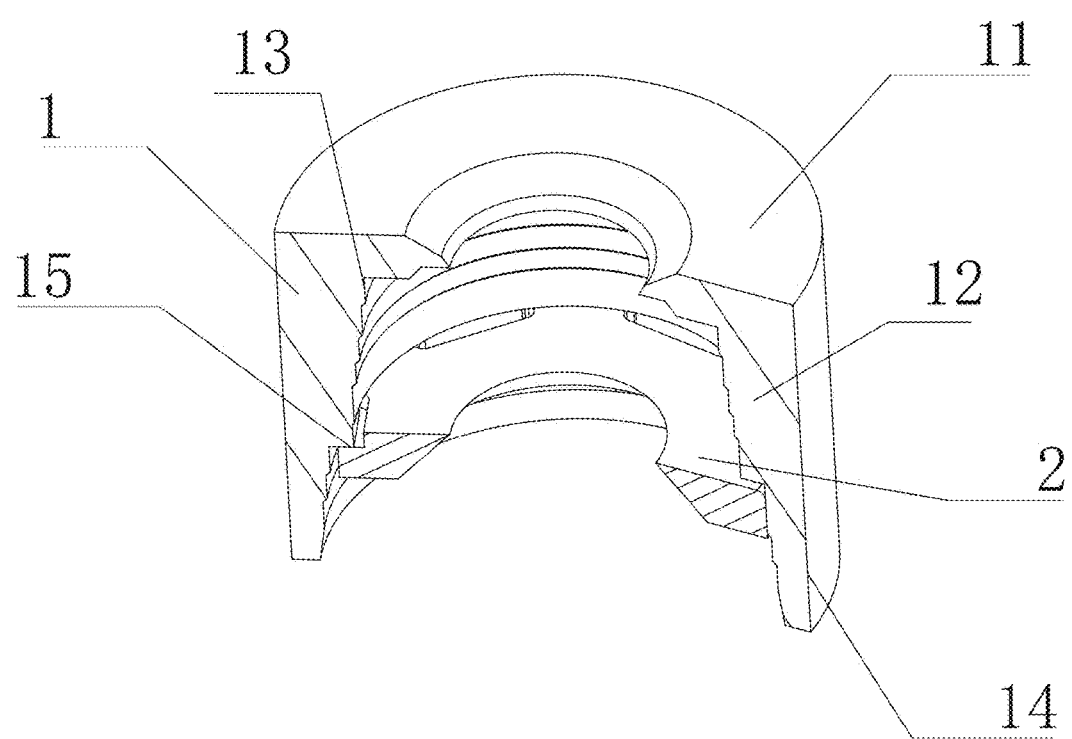
FIG. 3 is a sectional view of a lens barrel of a light shading plate in accordance with Embodiment 1 of the present disclosure.

Embodiment 1 of the present disclosure relates to an imaging lens, as shown in FIGS. 1-3, including a lens group 3 having at least 2 lenses, a lens barrel 1 and a light shading plate 2 provided between any two adjacent lenses. The lens group 3 includes a plurality of lenses, in the present embodiment, taking 6 lenses as an example for illustration, and there is a light shading plates 2 between any two adjacent lenses, i.e., there is an adjacent lens at each side of the light shading plate 2.

The above-mentioned lens barrel 1 includes: a first barrel wall 11 which forms a light aperture and a second barrel wall 12 which is bended and extends from the first barrel wall 11, the lens barrel 1 includes an internal wall 13 and an external wall 14 corresponding to the internal wall 13.

It should be noted that, a plurality of groups of clamping positions are provided along a circumferential direction on the internal wall 13, in the present embodiment, taking three clamping positions as an example for illustration, each of the clamping positions includes two equally spaced bosses 15 which are provided in a circumferential direction on the internal wall 13. Surface of the boss 15 toward the first barrel wall 11 is a supporting surface. Optionally, the supporting surface is a plane. It should be noted that, the supporting surfaces of the bosses 15 in a same clamping position are all in a same horizontal level. Moreover, supporting surfaces of the bosses 15 in different clamping positions are in different horizontal levels, that is to say, each group of bosses 15 in the lens barrel 1 have one unique height. In the present embodiment, there are two bosses 15 in each group, however, there could be any other number of bosses in other embodiments.

Besides, in order to fit the bosses 15, two clamping slots 21 and four avoiding slots 22 which are equally spaced are provided in a circumferential direction on the light shading plate 2, the number of the clamping slots 21 and the avoiding slots 22 are determined according to the number of the bosses 15 and, particularly, the total number of the clamping slots 21 and the avoiding slots 22 is at least equal to the number of the bosses 15. Moreover, the two clamping slots 21 fit all the bosses 15 in any one of the clamping positions at the same time, the avoiding slots 22 are configured to accommodate the bosses 15 in the other groups; during the assembling of the light shading plate 2 with the lens barrel 1, the bosses 15 can be embedded into the clamping slots 21 and the avoiding slots 22 on the light shading plate 2 by rotating the light shading plate 2.

It should be noted that, a gap always exists between the light shading plate 2 and an adjacent lens located at a side of the first barrel wall 11, in the present embodiment, taking that the lens group 3 includes six lenses as an example for illustration, during assembling of the light shading plate 2, the adjacent lenses are the fifth lens and the sixth lens, and the gap 8 is located between the light shading plate 2 and the fifth lens.

It should be noted that, the spacing distance of the gap 8 varies with the fitting between the clamping slots 21 and the bosses 15 of different horizontal levels, that is to say, the greater the horizontal level of the boss 15 is, the greater the gap 8 between the light shading plate 2 and the fifth lens is after the clamping slot 21 and the boss 15 are fitted together. It should be noted that, the depth of the clamping slot 21 is smaller than the minimum height of the bosses 15, such that the supporting surface of the boss 15 can contact with the bottom of the clamping slot 21 when the boss 15 is embedded into the clamping slot 21, so as to guarantee interaction between the clamping slot 21 and the boss 15.

Additionally, it should be noted that, the two clamping slots 21 at the same time can only be fitted with two bosses 15 of a same horizontal level in a same clamping position, and the other bosses 15 are accommodated in the avoiding slots 22; the depths of the avoiding slots 22 are greater than the maximum height of the bosses 15, so as to accommodate the bosses 15 of all the heights in the avoiding slots 22. Thus, whichever group of bosses 15 are embedded into the avoiding slots 22, the supporting surfaces of the bosses 15 can be guaranteed not contact with bottoms of the avoiding slots 22.

Moreover, it should be noted that, in the present embodiment, the bosses 15 and the lens barrel 1 are integratedly formed as a whole, and the boss 15 is formed in block structures on the ladder on the internal wall 13 of the lens barrel 1. The light shading plate 2 sinks from its edge toward its central axis and forms an notch 23 and, specifically, before the light shading plate 2 is installed into the lens barrel 1, a plurality of lenses have already been installed at a side of the light shading plate 2 toward the first barrel wall 11, an adjacent lens located at a side of the light shading plate 2 toward the first barrel wall 11 in the lens barrel 1 is fixed with the lens barrel 1 via glue dispensing, when assembling the light shading plate 2, in order to guarantee separation between the light shading plate 2 and the adjacent lenses, in the present embodiment, the light shading plate 2 and the lens barrel 1 are fixed via glue dispensing at the notch 23 after the fifth lens is mounted into the lens barrel 1, so as to fix the light shading plate 2 in the interior of the lens barrel 1.

In the present embodiment, the lens group further includes a sixth lens provided below the light shading plate 2, a pressing ring is provided at a surface at an image side of the sixth lens, the pressing ring fixes the sixth lens in the interior of the lens barrel 1, and the pressing ring can be fixed with the lens barrel 1 via glue dispensing or interference fitting.

In summary, a plurality of groups of equally spaced bosses 15 are provided in a circumferential direction on the internal wall 13 of the lens barrel 1, the surface of the bosses 15 at a side toward the first barrel wall 11 is a supporting surface, moreover, the supporting surfaces of the bosses 15 in a same group are in a same horizontal level and are parallel to the horizontal level where the supporting surfaces of the bosses 15 in the other groups are located, one group of equally spaced clamping slots 21 and a plurality of groups of avoiding slots 22 are provided in a circumferential direction on the light shading plate 2, and all the clamping slots 21 can be fitted with all the bosses 15 in any group at the same time and the avoiding slots 22 are configured to accommodate the bosses 15 in the other groups. It should be noted that, the light shading plate 2 is spaced from an adjacent lens located at a side of the first barrel wall 11, i.e., the two do not contact with each other and a gap exists therebetween. In this way, when the light shading plate 2 and the lens barrel 1 are assembled, the spacing distance between the clamping slots 21 on the light shading plate 2 and the adjacent lens can be changed by rotating the light shading plate 2 and determining that the clamping slots 21 on the light shading plate 2 are fitted with the bosses 15 with different heights, and thus the spacing distance between the light shading plate 2 and the adjacent lens at a side of the first barrel wall 11 can be changed. Such design has a simple structure and is easy to implement, and does not need a plurality of light shading plates 2 of different thicknesses, and thus has a wide application and saves the cost.

Figure 4:
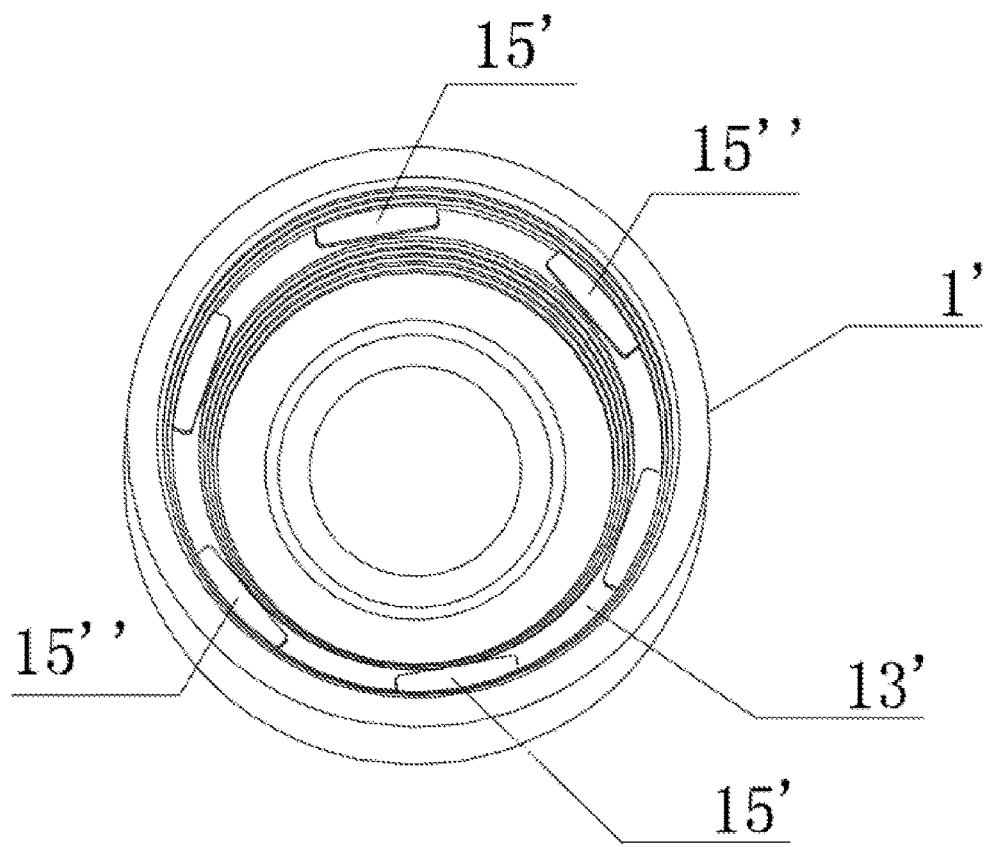
FIG. 4 is a schematic diagram of a lens barrel in accordance with Embodiment 2 of the present disclosure.

Embodiment 2 of the present disclosure relates to an imaging lens, the main differences include: in the present embodiment, as shown in FIG. 4, the boss (15', 15") is of a plate-shaped structure which is formed in a manner that the internal wall 13' of the lens barrel 1' extends toward the central axis of the lens barrel 1'.

It can be understood by those in the art that, the above are merely embodiments of the present disclosure, however, in actual application, there could be various modifications to forms and details thereof without departing from the spirit and scope of the present disclosure.

What is claimed is:

1. An imaging lens, comprising:
a lens group having at least two lenses,
a lens barrel comprising a first barrel wall which forms a light aperture and a second barrel wall which is bended and extends from the first barrel wall, and further comprising an internal wall and an external wall corresponding to the internal wall, wherein at least two clamping positions are provided in a circumferential direction on the internal wall of the second barrel wall, each of the clamping positions comprises equally spaced at least two bosses which are provided on the internal wall; and
a light shading plate provided between any two adjacent lenses;
wherein the boss comprising supporting surfaces to fit the light shading plate, the supporting surfaces are totally back to the first barrel wall, and a horizontal height of the bosses in a same clamping position is identical with each other, while being different from horizontal heights of the bosses in other clamping positions;
at least two clamping slots configured to fit all the bosses in any one of the clamping positions at the same time and avoiding slots configured to accommodate all the bosses in remaining clamping positions, which are equally spaced from each other, are provided in a circumferential direction on the light shading plate, and there is a gap between the light shading plate and an adjacent lens located at a side of the first barrel wall, the clamping slots are respectively engaged with the clamping positions of different heights to adjust the gap.

2. The imaging lens as described in claim 1, wherein the boss and the lens barrel are integratedly formed as a whole.

3. The imaging lens as described in claim 2, wherein the supporting surface is a horizontal plane.

4. The imaging lens as described in claim 1, wherein a depth of the avoiding slot is greater than a maximum height of the boss.

5. The imaging lens as described in claim 1, wherein a depth of the clamping slot is smaller than a minimum height of the boss.

6. The imaging lens as described in claim 1, wherein an adjacent lens at a side of the light shading plate toward the first barrel wall is fixed with the lens barrel via glue dispensing.

7. The imaging lens as described in claim 1, wherein the number of the clamping slots is equal to the number of the bosses in each of the clamping slots, and the sum of the number of the clamping slots and the avoiding slots is greater than or equal to the sum of the number of the bosses of the clamping positions.

8. The imaging lens as described in claim 1, wherein the supporting surfaces only abuts the light shading plate.

\* \* \* \* \*